United States Patent Office 3,375,229
Patented Mar. 26, 1968

3,375,229
LIGHT-SENSITIVE POLYMERS HAVING A LINEAR CHAIN CONTAINING THE STYRYL KETONE GROUP
Douglas G. Borden, Cornelius C. Unruh, and Stewart H. Merrill, Rochester, N.Y., assignors to Eastman Kodak Company, Rochester, N.Y., a corporation of New Jersey
No Drawing. Original application July 21, 1959, Ser. No. 828,455. Divided and this application July 22, 1964, Ser. No. 422,476
6 Claims. (Cl. 260—50)

ABSTRACT OF THE DISCLOSURE

Linear polymers containing photosensitive styryl ketone group in the polymeric chain and which are useful in photographic processes involving photosensitive polymers, e.g., for lithographic plates, are aldehyde-ketone condensation polymers in which a dialdehyde having an aldehyde group attached to a benzene ring is condensed with a reactive methyl or methylene group attached to carbonyl in a ketone having two such reactive groups. Example is condensation polymer of 1,3-di-(o-formylphenoxy)-propane and acetone.

This invention relates to light-sensitive polymers containing recurring styryl ketone groups of the structural formula

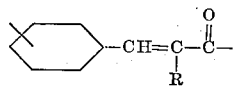

as an integral part of the polymer backbone; R being hydrogen or a hydrocarbon group. This is a division of application Ser. No. 828,455 filed July 21, 1959 by the same inventors.

Although a number of polymers containing light-sensitive styryl ketone groups have been described in the past, the light-sensitive groups have invariably occurred as side chains attached to a polymer backbone. For example, styryl ketone groups have previously been appended to the hydrocarbon backbone of a vinyl polymer.

A primary object of the present invention is to introduce the light-sensitive styryl ketone group into the backbone of certain polymers in order to provide compositions of greater inherent sensitivity to light.

The above and other objects of the invention are attained by the preparation of the novel polymers described hereinafter which have been divided into four groups for purposes of discussion.

Polymers of Group IV are formed by the condensation of an aromatic dialdehyde or bisaldehyde with a ketone having two reactive methyl or methylene groups, each adjacent to a carbonyl group. Representative light-sensitive polymers of the present invention are illustrated by the following formulae and equation:

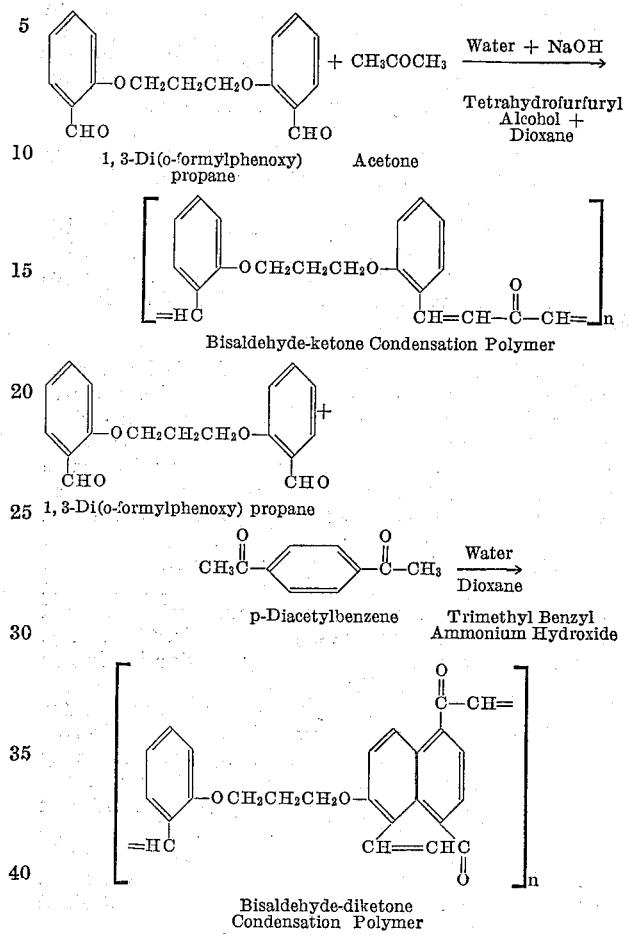

In the formulae above $n$ is a number sufficiently large to ensure a film-forming or resinous polymer and in most cases is at least 5; polymers in which $n$ is greater than 5, i.e., 10–30 or higher are preferred.

As noted above, the polymers of Group IV are formed by the condensation of dialdehydes or bisaldehydes, in which the aldehyde groups are separated by an aromatic nucleus, with a ketone or diketone containing at least two reactive methyl or methylene groups, each adjacent to a carbonyl group. The dialdehyde-ketone condensation is carried out in an inert organic solvent or solvent mixture at ambient or slightly elevated temperatures in the presence of an alkaline catalyst which may be sodium hydroxide or one of the catalysts noted above as useful in the preparation of the polymers of Groups I, II and III. Also, as with the preparation of the previously described polymers, the reaction may be stopped, when sufficiently complete, by the addition of excess acetic acid to the reaction mixture. The polymer can then be precipitated by pouring the reaction mixture into a large volume of methanol or water and the product purified by solution in dioxane and repreciptation in methanol or water.

Aldehydes useful for the preparation of the polymers of Group IV include dialdehydes and bisaldehydes in which the two aldehyde groups are separated by an aromatic nucleus, preferably, but not limited to, nuclei of the benzene series. The aromatic nucleus may be substituted or unsubstituted so long as it is free from photographically active groups or functional groups which would interfere with the course of the aldehyde-ketone condensation reaction. Specific aldehydes which have been found useful in the invention include 1,3-di(o - formylphenoxy)propane, 1,3 - bis(2-methoxy-6-formylphenoxy)propane and terephthaldehyde among others.

The ketones and diketones employed in the preparation of the polymers of Group IV may be either aliphatic, alicyclic or aromatic in nature so long as they contain two and only two reactive methyl or methylene groups each adjacent to a carbonyl group. Specific ketones of this description include acetone, cyclohexanone and p-diacetylbenzene. Mixtures of these ketones, e.g., a mixture of acetone and diacetylbenzene, may also be employed with advantage.

The preparation, properties and utility of representative polymers will be described in detail in the following specific examples which are illustrative only and are not to be construed as limiting the scope of the invention.

*Example 31*

Fourteen and two-tenths grams of 1,3-di(o-formylphenoxy) propane was dissolved in 50 ml. of tetrahydrofurfuryl alcohol by gentle warming. To this was added 25 ml. of 1,4-dioxane and 2.9 grams of acetone. To the solution was then added 2.0 ml. of 40% sodium hydroxide solution. The solution was well shaken. It became orange in color and quite warm. After 40 minutes, the solution became cloudy, and at this point 3 ml. of glacial acetic acid was added. The product was then poured into a large volume of agitated methanol and the resulting bright yellow polymer was washed several times with methanol and dried. The yield was nearly that required by theory. The polymer was further purified by solution in dioxane and precipitation in methanol.

A 2% solution of this polymer in dioxane was coated on a rosin sized paper overcoated with a layer of partially formaldehyde tanned casein containing zinc acetate by whirling the solution onto the surface at 78 r.p.m. The coating was exposed under a line negative to a 275 watt sunlamp for five minutes at 8″. The coating was developed for one minute in dioxane and the surface was inked in accordance with the directions recommended for that surface. A clean, positive image was obtained corresponding to that on the negative.

*Example 32*

The procedure in Example 31 was repeated substituting 4.9 grams of cyclohexanone for the acetone. The condensation was allowed to proceed for one hour before the addition of the acetic acid. Again a bright yellow product was obtained, soluble in dioxane.

*Example 33*

A solution was made by warming together 14.2 grams of 1,3-di-(o-formylphenoxy)propane, 8.1 grams of p-diacetylbenzene, and 50 ml. of 1,4-dioxane. To the solution was added 1.0 ml. of a 40% solution of trimethyl benzyl ammonium hydroxide. The solution rapidly turned dark orange in color. After two hours' standing, the slightly viscous solution was treated with a little glacial acetic acid to neutralize the alkaline catalyst. This was then poured into a large volume of agitated methanol. The product was redissolved in dioxane and poured into a large volume of water. The yellow precipitate was filtered off, washed well with water and dried in the dark. The polymer was readily soluble in dioxane and butanone-2.

*Example 34*

To a solution of 2.64 grams of terephthaldehyde and 1.16 grams acetone in 35 ml. of tetrahydrofuryl alcohol was added 0.5 ml. of 50% potassium hydroxide solution. The solution became brown-red in color. After standing 24 hours in the dark, the alkaline catalyst was neutralized with acetic acid, and the solution poured into a large volume of water. The yellow product was filtered off, washed with water and dried.

The relative speed of the various light-sensitive polymers described above has been indicated by reference to a number called the "glass factor" or "plexiglass factor" of the material. The glass factor or plexiglass factor is the relative speed of the material tested when exposed to ultraviolet or visible light, such as that from a white flame carbon arc, under glass or plexiglass as the case may be, compared with the speed of an unsensitized coating of polyvinyl cinnamate as a standard. The speed of the standard is taken as 1.0 for both glass and plexiglas and therefore the glass factor and plexiglass factor of a given material are not mathematically interconvertible. A material with a glass factor of 100 is 100 times as fast or light sensitive as unsensitized polyvinyl cinnamate. The inherent viscosities of the polymers described above were determined at a concentration of 2.5 grams per liter. The term "light sensitive" as employed in the specification and claims is intended to mean that the bisphenol or polymer in question when exposed to light undergoes a change in its solubility characteristics. For example, in the case of the polymers, exposure to light causes cross linking which renders the exposed polymers insoluble in solvents for the unexposed polymer.

We claim:
1. A light-sensitive, film-forming synthetic linear condensation polymer of (a) at least one dialdehyde having two terminal aldehyde groups separated by at least one benzene nucleus and having at least one such terminal group attached directly to a benzene ring on the dialdehyde structure, and (b) at least one ketone having two reactive groups, each selected from methyl and methylene, with each of such two reactive groups attached directly to a carbonyl group in the ketone structure, said polymer comprising in the polymeric chain recurring photosensitive styryl ketone groups formed by the condensation reaction in inert organic solvent with alkaline catalysts of one said aldehyde group attached directly to a benzene ring in the dialdehyde structure with one said reactive group of the ketone structure.

2. The polymer of claim 1 wherein said dialdehyde consists of at least one member selected from the group consisting of 1,3-di(o-formylphenoxy)propane, 1,3-bis(2-methoxy-6-formylphenoxy)propane, and terephthaldehyde and said ketone consists of at least one member selected from the group consisting of acetone, cyclohexanone, and diacetylbenzene.

3. The polymer of claim 1 wherein said dialdehyde consists of 1,3-di(o-formylphenoxy)propane and said ketone consists of acetone.

4. The process of claim 1 wherein said dialdehyde consists of 1,3-di(o-formylphenoxy)propane and said ketone consists of cyclohexanone.

5. The polymer of claim 1 wherein said dialdehyde consists of 1,3-di(o-formylphenoxy)propane and said ketone consists of diacetylbenzene.

6. The polymer of claim 1 wherein said dialdehyde consists of terephthaldehyde and the ketone consists of acetone.

References Cited

UNITED STATES PATENTS 3,043,802   7/1962   Thomas et al. _____ 260—47 X

WILLIAM H. SHORT, *Primary Examiner.*

H. D. ANDERSON, *Assistant Examiner.*